(12) United States Patent
Henningsen (10) Patent No.: US 6,668,459 B2
(45) Date of Patent: Dec. 30, 2003

(54) STRIPPING TOOL FOR COAXIAL CABLE

(75) Inventor: Jimmy Henningsen, Naestved (DK)

(73) Assignee: Corning Gilbert Inc., Glendale, AZ (US)

( * ) Notice: Subject to any disclaimer, the term of this patent is extended or adjusted under 35 U.S.C. 154(b) by 0 days.

(21) Appl. No.: 10/124,525

(22) Filed: Apr. 16, 2002

(65) Prior Publication Data

US 2002/0189106 A1 Dec. 19, 2002

(30) Foreign Application Priority Data

Apr. 23, 2001 (EP) .............................................. 01109855

(51) Int. Cl.[7] ................................................ B21F 13/00
(52) U.S. Cl. ............................. 30/90.2; 30/90.1; 81/9.4
(58) Field of Search ................................ 30/90.1, 90.2; 81/9.4

(56) References Cited

U.S. PATENT DOCUMENTS

| | | | | |
|---|---|---|---|---|
| 3,878,606 A | * | 4/1975 | Hug ............................. | 30/90.1 |
| 4,114,266 A | * | 9/1978 | Erpenbeck ................... | 30/90.1 |
| 4,345,375 A | * | 8/1982 | Hayward ..................... | 30/90.1 |
| 4,559,704 A | * | 12/1985 | Michael, III ................. | 30/90.1 |
| 6,242,699 B1 | * | 6/2001 | Greiner et al. ............... | 30/90.2 |
| 6,397,474 B1 | * | 6/2002 | Losinger ...................... | 30/90.2 |

FOREIGN PATENT DOCUMENTS

| DE | 42 07 482 | 7/1993 | ............. | H02G/1/14 |
|---|---|---|---|---|
| WO | WO00/52801 | 9/2000 | ............ | H02G/1/12 |

OTHER PUBLICATIONS

Patent Abstract of JP 10 112914 A, Mitsubishi Cable Ind Ltd, Apr. 28, 1998.

* cited by examiner

Primary Examiner—Hwei-Siu Payer
(74) Attorney, Agent, or Firm—Joseph M. Homa; Budde, Schou & Ostenfeld A/S (57) ABSTRACT

The invention relates to stripping tools for coaxial cables with a corrugated outer conductor and a hollow inner conductor. The tool comprises three main parts: a jacket cutting part for removing a certain predetermined length of the jacket of the cable, a guide part to be placed around the end of the cable after the jacket has been removed by the jacket cutting part, and a second cutting part to be placed on the guide part during a final preparation of the end of the cable during which the inner conductor, the outer conductor and the dielectric material between inner- and outer conductor are being cut off to appropriate lengths. The guide part is provided with a portion for determining a well-defined longitudinal position of the tool on the cable relative to the pattern of valleys and crests of the corrugation on the outer conductor. Using the tool according to the invention it is thereby possible to: (a) expose a predefined length of outer conductor; (b) cut off the inner conductor and the dielectric material at a predetermined longitudinal position relative to the end of the outer conductor, and (c) ascertain that the outer conductor is cut off substantially at a valley of the corrugation.

13 Claims, 5 Drawing Sheets

STRIPPING TOOL FOR COAXIAL CABLE

This application claims the benefit of priority under 35 U.S.C. §119(e) for European Patent Application 01109855.5 filed on Apr. 23, 2001, the content of which is relied upon and incorporated herein by reference in its entirety.

TECHNICAL FIELD

The present invention relates to stripping tools for coaxial cables and more particularly to such tools for coaxial cables with a corrugated outer conductor and a hollow inner conductor.

SUMMARY OF THE INVENTION

A coaxial cable of the above mentioned kind comprises a hollow inner conductor with a longitudinal axis and coaxially with said inner conductor a tubular layer of insulating material between said inner conductor and an outer conductor which is corrugated in a non-helical manner in order to improve flexibility of the cable, said outer conductor thereby comprising a repeated axial pattern of crests and valleys, and finally provided with an outer insulating jacket.

It is an object of the present invention to provide a stripping tool for a coaxial cable with said kind of corrugated outer conductor and a hollow inner conductor, which tool is capable of performing all stripping steps required in order to prepare the cable for insertion into a coaxial connector.

More specifically said tool must be capable of providing the correct relative axial locations of the end of the inner conductor, the end of said insulating material provided between the inner and outer conductor, the end of the corrugated outer conductor and the end of the jacket. Furthermore, said correct relative axial locations must be obtained with the tool no matter at what axial location the cable is initially cut off.

According to the present invention there is thus provided a stripping tool comprising the following main means:

A jacket cutting means for stripping the appropriate axial length of the jacket, thereby exposing the corresponding axial length of said outer conductor.

A guide means to be placed coaxially around the coaxial cable after said appropriate axial length of the jacket has been removed as described above, where said guide means during operation of the stripping tool guides a second cutting means and provides a well defined axial abutment surface for this means. The guide means is furthermore provided with position determining means so that it can be located at a well-defined axial position relative to said repeated pattern of crests and valleys thereby positioning said abutment surface at a well-defined axial position relative to said pattern of crests and valleys.

A second cutting means for providing the required relative axial positions of the end of the outer conductor, the corresponding end of the insulating material between the inner conductor and the outer conductor and the end of the inner conductor, said second cutting means being guided by said guide means and being provided with cutters, blades or similar means operating while the second means is being displaced axially relative to the cable along said guide means until said abutment between the second cutting means and said guide means is obtained.

BRIEF DESCRIPTION OF THE DRAWINGS

The invention will now be described in more detail with reference to the accompanying drawings, in which.

DETAILED DESCRIPTION OF THE INVENTION

In the following, a detailed description of a preferred embodiment of the invention is given, but it is understood that other designs of the various details in the stripping tool may be made by a person skilled in the art without departing from the scope of the invention as defined by the following claims. One such alternative embodiment, differing from the first embodiment only with respect to one particular feature is also briefly described.

The stripping tool according to the preferred embodiment of the invention consists of three main parts: a jacket cutting means 1 for exposing an appropriate length of the outer conductor of the cable as a necessary preparation for the following steps in the stripping procedure, a guide part 10 to be placed coaxially over the end of the cable prepared by the jacket cutting means 1 in the preceding step and serving as a guide- and abutment means for a second cutting means 18 for providing the correct relative longitudinal extension of exposed outer conductor, inner conductor and insulating material placed between the inner and outer conductors.

Figure 1:
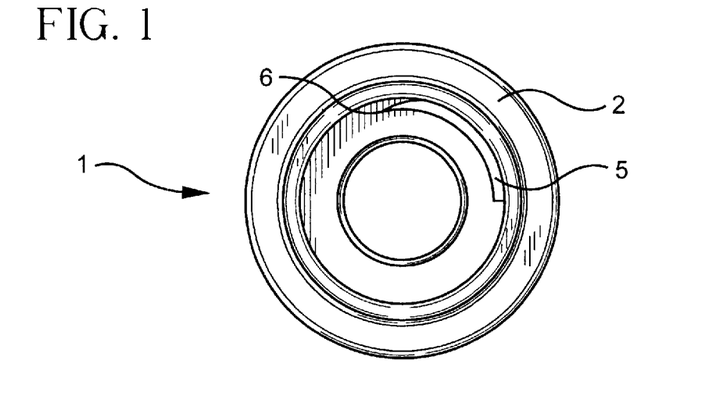
FIG. 1 is an end view of a jacket cutting means according to the invention.
Figure 1A:
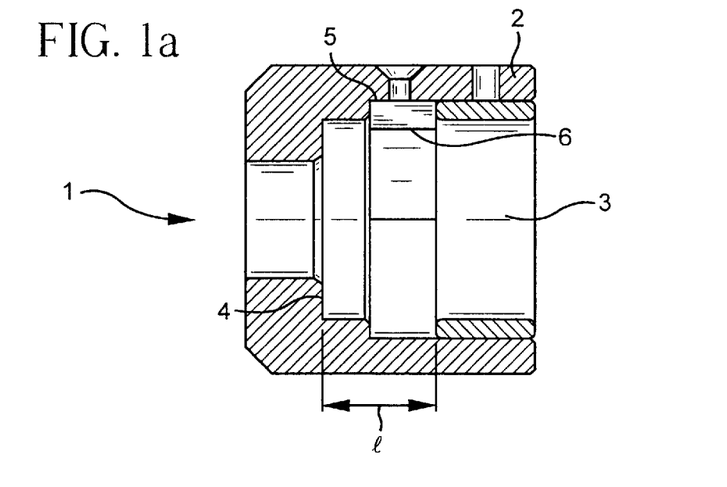
FIG. 1a is a schematic view of a jacket cutting means according to the invention.

FIG. 1a shows a schematic view of the jacket cutting means 1 of the stripping tool in longitudinal cross section and seen from that end of the jacket cutting means 1 into which the end of a coaxial cable to be prepared for insertion in a connector is to be inserted. The jacket cutting means 1 essentially comprises a tubular body 2, the inner diameter of which corresponds to the outer diameter of the jacket of the coaxial cable. The tubular body 2 is open at one end 3 where the cable is to be inserted and closed at the other end by a wall 4 substantially perpendicular to the longitudinal axis through the tubular body 2. A certain length of cable can thus be inserted into the tubular body. At the inner circumferential wall of the tubular body 2 there is provided a cutting means 5 in the form of a knife blade with a cutting edge 6 facing the longitudinal axis. The cutting edge 6 starts at a longitudinal distance 1 from the end wall 4 of the tubular body 2, this distance 1 corresponding to the longitudinal length of cable jacket to be removed.

Figure 1B:
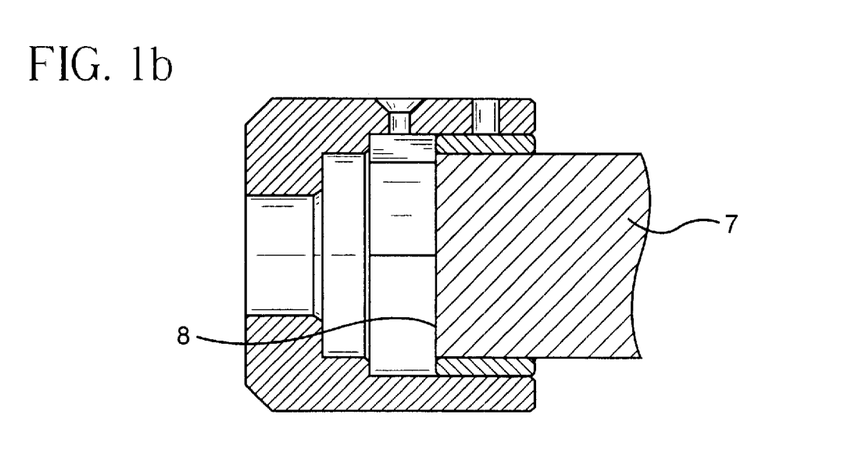
FIG. 1b is a schematic view of the end of a coaxial cable inserted in the jacket cutting means in an initial position prior to stripping of the jacket.
Figure 1C:
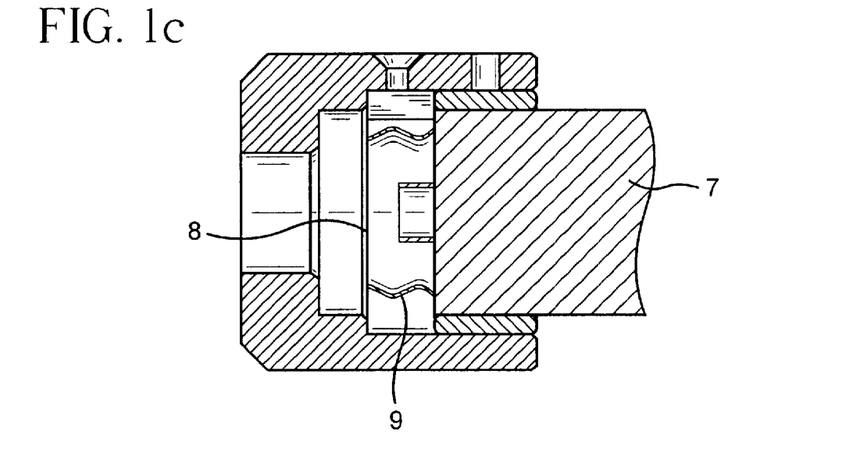
FIG. 1c is a schematic view corresponding to FIG. 1b with the coaxial cable in the final position with an appropriate length of the outer conductor exposed.
Figure 1D:
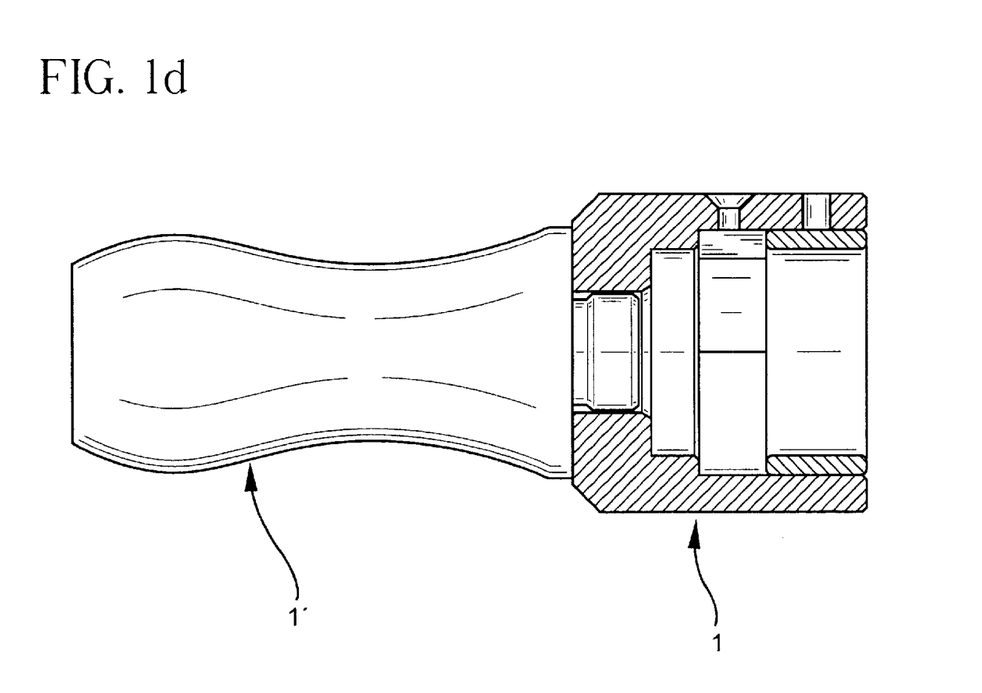
FIG. 1d is a schematic view of the jacket cutting means according to the preceding Figures provided with a handgrip.

The operation of the cutting means 1 is depicted in FIGS. 1b and 1c. FIG. 1b shows an end of the coaxial cable 7 inserted into the tubular body 2 to an initial position where the end of the cable just touches the end of the cutting edge located the distance 1 from the end wall 4. After insertion of the cable to this point, the cable is further advanced towards the end wall 4, the tubular body 2 simultaneously being rotated about its longitudinal axis. The resultant relative movement of the cutting edge 6 and the jacket of the cable results in the jacket being cut off helically over the longitudinal distance l, thereby exposing a corresponding length of the corrugated outer conductor 9.

Figure 2A:
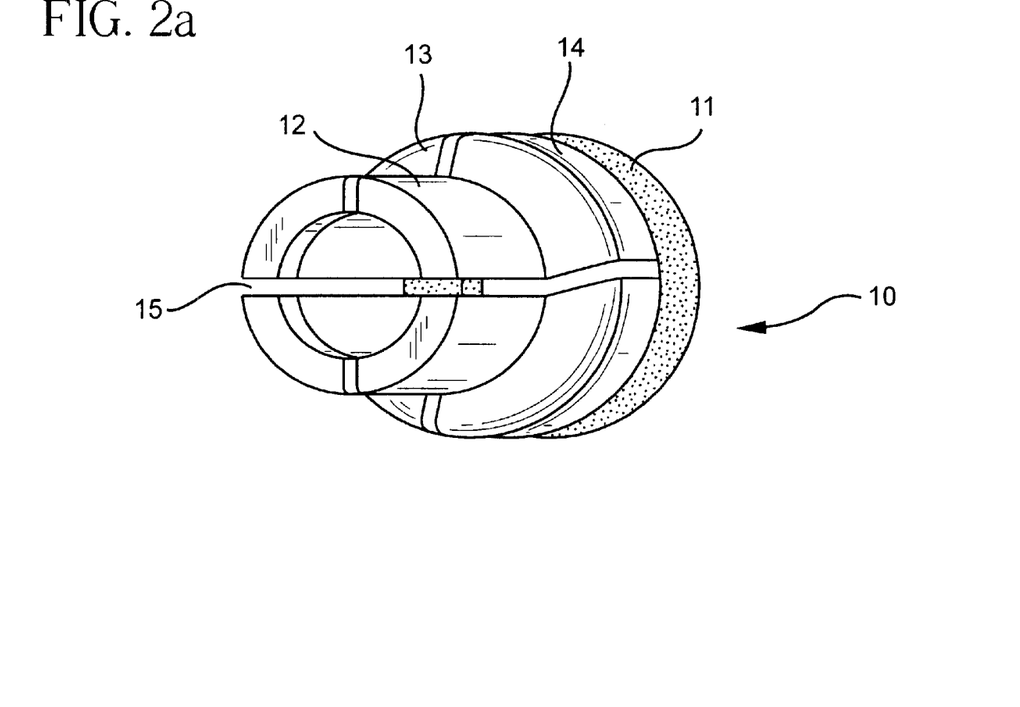
FIG. 2a is a schematic perspective view of a guide part according to the invention.
Figure 2B:
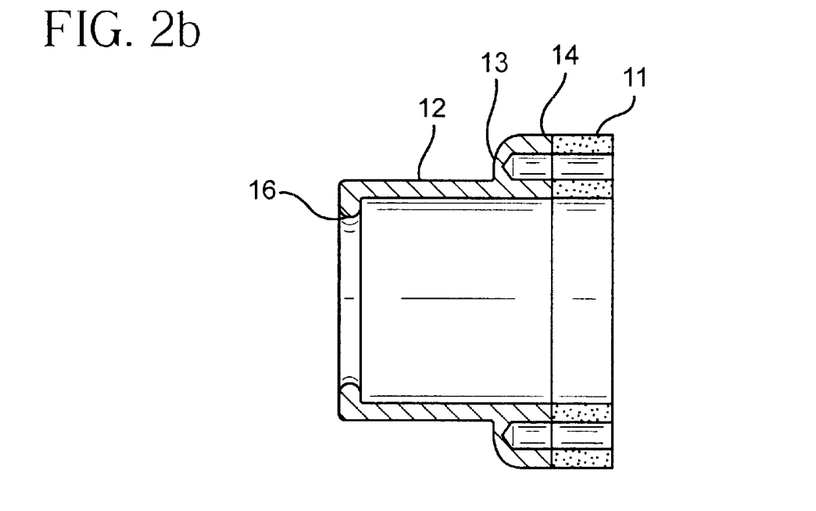
FIG. 2b is a longitudinal sectional view of the guide part shown in FIG. 2a, FIG. 2c is a longitudinal sectional view corresponding to FIG. 2b but with a cable prepared with the aid of the jacket cutting means inserted into the operative position in the guide part.
Figure 2C:
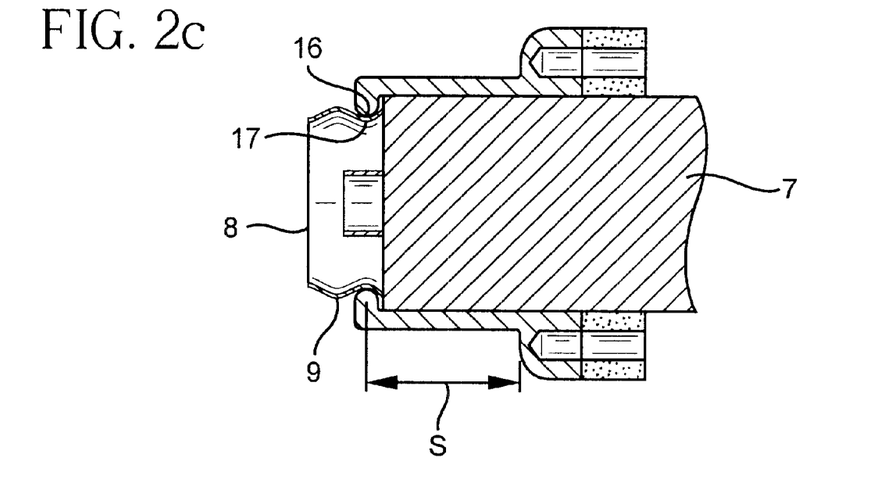

FIG. 2a shows a schematic view of the above mentioned guide part 10 to be placed on that end of the coaxial cable which has been prepared as described above. More specifically the guide part 10 comprises a rotationally symmetrical body composed of two sections: a tubular section 11 made of a resilient material such as hard rubber, to which section is attached a second section 12, 13, 14 made of a substantially rigid material and longitudinally cut into a number of subsections by a number of slits 15 through the wall of the second section, in this embodiment 4 subsections of equal circumferential dimensions, although other numbers of subsections could of cause also be used. By cutting up the wall of the second section longitudinally in the manner described, it is made possible for this section to undergo radial displacements except al that end of the second section where it is attached to said resilient first section. As shown in FIGS. 2b and 2c, a through bore is provided through the coaxially placed first and second sections, the diameter of this through bore substantially corresponding to the outer diameter of the jacket of the cable. It is thus possible to insert the cable into the guide part 10 from the side of the resilient first section. Furthermore, the second section is at the end hereof facing away from the first section provided with inwardly directed tongues 16.

FIG. 2c shows the guide part with a cable prepared by means of the jacket cutting means 1 inserted. Due to the radially resilient construction of the guide part, as provided by the resilient first section and the longitudinal slits 15 in the second section, it is possible to insert the end 8 of the cable to a point beyond said inwardly directed tongues 16, so that these tongues 16 thereby fit into the corrugation of the outer conductor 9 at those places 17 where the diameter of the outer conductor 9 is smallest, i.e. Into the "valleys" of the corrugation. During operation of the stripping tool the prepared cable is inserted in the guide part 10 so that said tongues 16 fit into that valley of the corrugation which is located closest to the end of the jacket 7 of the cable. In this manner a well-defined longitudinal placement of the guide part 10 on the cable is obtained, which is essential for the further operations of the stripping tool.

Figure 2D:
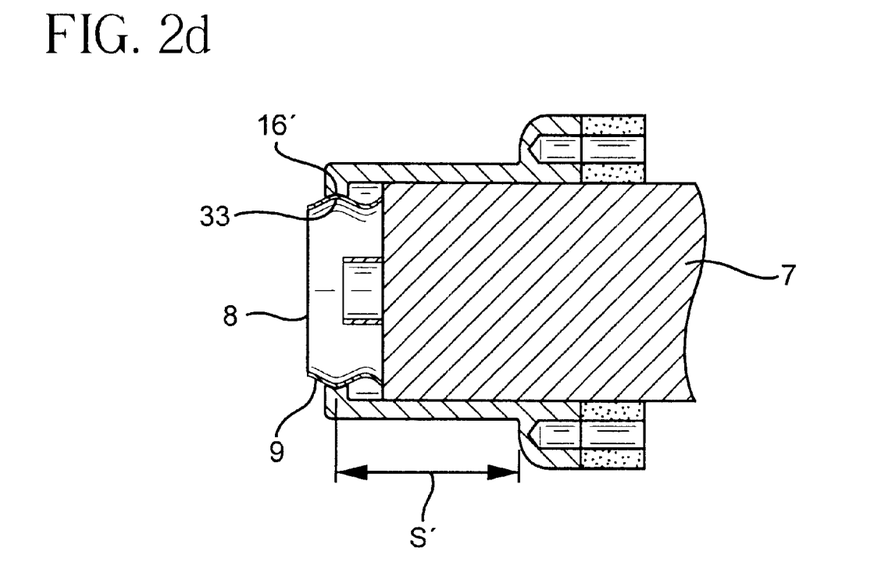
FIG. 2d is a longitudinal sectional view of an alternative embodiment of the guide part.

Referring to FIG. 2d there is shown an alternative embodiment of the position determining means, which in the embodiment described above was implemented in the form of the tongues 16 according to FIGS. 2b and 2c. In this alternative embodiment of the position determining means, radially inwardly directed tongues 16' are provided, where the surface of the tongues to be brought into contact with the corrugated outer conductor is provided with a recess to enable it to grip over the top of the crests 33 of the corrugation instead of fitting into the valleys as in the previously described embodiment. Otherwise the construction of the guide part does not differ from the guide part 10 according to the first embodiment.

It is understood that the construction of the guide part 10 based on the radially resilient section 11 and the split up second section 12, 13, 14, 16 is chosen in order to provide the end of the guide part 10 which is provided with said tongues 16 with sufficient radial resiliency to make it possible to pass the end of the cable through the through hole in the guide part 10 despite the presence of the radially inwardly directed tongue 16, 16' and furthermore to obtain a fixed and reliable positioning of these tongues in the appropriate valley of the corrugation of the outer conductor. The required radial resiliency of the portion of the guide part comprising the tongues 16, 16' could, however, also be achieved in other manners without the necessity to split up the second section of the guide part by the longitudinal slits 15. For this purpose either the end of the guide part 10 comprising the tongues 16, 16' could be made of a suitable resilient material with the remaining longitudinal extension of the guide
part, including the tubular section 11, being made of a rigid material, or the whole guide part 10 could be made of a material with sufficient radial resiliency, provided a well-defined abutment surface 13 and a well-defined longitudinal distance s (see FIG. 2c) or distance s (see FIG. 2d) were still obtained.

The outer surface of the second section of the guide part 10 is subdivided into three regions 12, 13, 14. In this manner, an abutment surface 13 for the second cutting means 18 mentioned initially is provided, said abutment surface 13 in this manner being located longitudinally at a well defined distance from said tongues 16, and thereby from the valley 17 in the corrugation of the outer conductor located closest to the end of the jacket (or from a corresponding crest 33 in case of the above second embodiment).

Figure 3A:
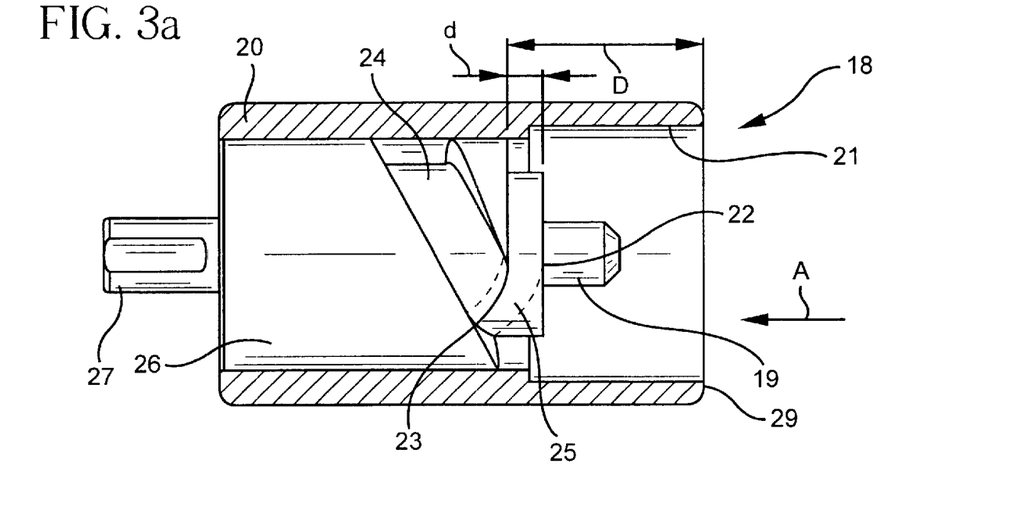
FIG. 3a is a longitudinal partly sectional view of the second cutting means according to the invention.
Figure 3B:
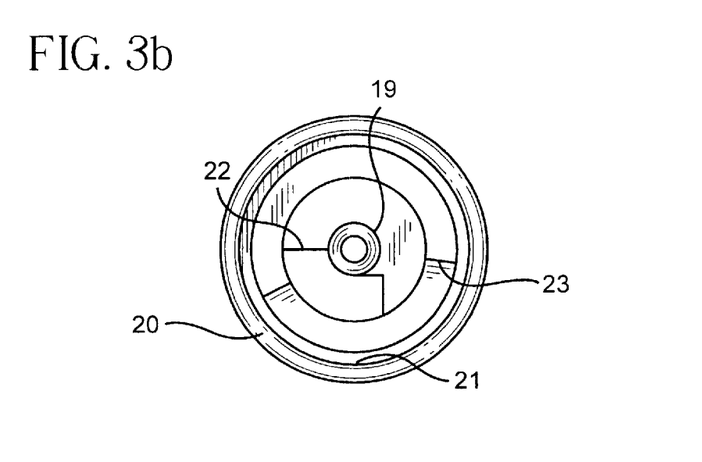
FIG. 3b is a schematic view of the second cutting means shown in FIG. 3a seen from the direction of the arrow A.

The last of the abovementioned three parts of the stripping tool according to the invention, i.e. the second cutting means 18, is shown schematically in FIGS. 3a and 3b. In FIG. 3a, a schematic longitudinal partly sectional view of the second cutting means generally indicated by 18 is shown. The second cutting means basically comprises a tubular house 20 to be placed coaxially over the previously described guide part 10, in such a manner that during operation hereof the circumferential inner surface 21 at one end of the second cutting means 18 fits on the corresponding region 12 of the guide part 10. Thus, when the guide part 10 is placed on the end of the cable as described in connection with FIGS. 2a through 2d, the second cutting means 18 can during rotation hereof be displaced longitudinally in a well defined manner relative to the end of the cable over a longitudinal distance ultimately determined by the end face 29 during said displacement being brought into contact with the abutment surface 13 on the guide part 10. In this final position of the second cutting means 18 a well-defined longitudinal relationship between the second cutting means 18 and the various structures of the coaxial cable (i.e. the jacket 7, the outer conductor 9, the insulating layer 32 between outer and inner conductor and the hollow inner conductor 31 disposed about hollow interior 30) are thus established.

Figure 4:
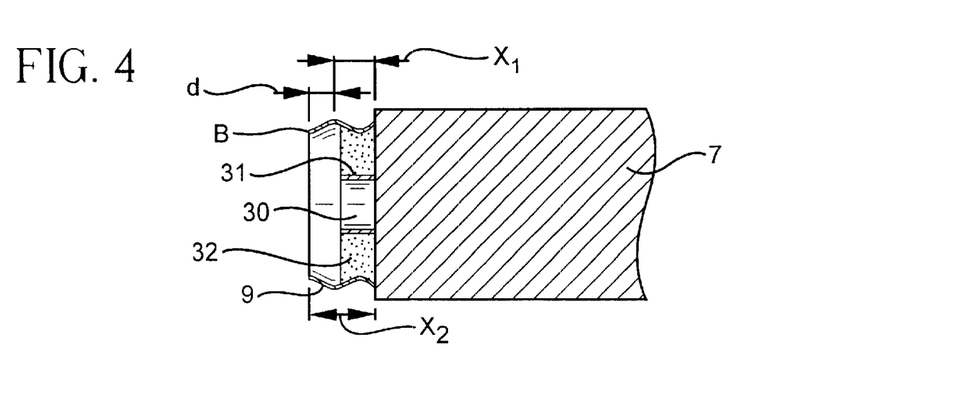
FIG. 4 is a schematic partly sectional view of the finished coaxial cable.

As mentioned in the disclosure of the invention the purpose of the stripping tool is to prepare the end of the cable in such a manner that the required longitudinal relationships between said structures of the cable are obtained. This is indicated in FIG. 4. Specifically the following requirements must be fulfilled: (1) The jacket 7 must be removed over the appropriate length of the outer conductor 9 as indicated by X2 in FIG. 4; (2) The end of the hollow inner conductor 31 and the insulating material 32 must be located at a distance of X1 from the end of the jacket; and (3) in order to achieve a proper fitting of a connector on the cable it is essential that the end of the outer conductor is located substantially at a "valley" of the corrugation, i.e. substantially at a part of the corrugation where this resumes the least diameter, as indicated by B in FIG. 4.

Returning to the detailed description of the second cutting means 18, said tubular house 20 comprises a first longitudinal section 21 of an inner diameter which fits the outer diameter of the corresponding section 12 on the guide part 10. In a second longitudinal section of the second cutting means 18 there is provided the cutting means 26 as such, which means 26 comprises guide tracks 24 and 25 and comprises a central longitudinal guide shaft 19 to be inserted into the end of the hollow inner conductor 31. Coaxially with the guide shaft 19 there is provided a cylindrical cutter means generally indicated by 26 in FIG. 3a comprising a first longitudinal portion containing a first cutting edge 22 and having a diameter corresponding to the smallest inner diameter of the outer conductor, so that this portion during operation can operate within the outer conductor without affecting this. When during operation the second cutting means 18 is rotated above its longitudinal axis about drive shaft 27, and hence relative to the cable, and simultaneously advanced longitudinally relative to the guide part 10, said cutting edge 22 cuts off the inner conductor 31 and the intermediate insulating material 32 to the appropriate longitudinal distance from the end of the jacket indicated by X1 in FIG. 4. The cutter means 26 is furthermore provided with a second cutting edge 23 located at one longitudinal end of a larger diameter second portion of the cutter means 26 and at a longitudinal distance d from the first cutting edge 22. During operation of the second cutting means 18 this second cutting edge 23 cut off the outer conductor 9 to its appropriate longitudinal length relative to the end of the jacket as indicated by X2 in FIG. 4. Thus the first two of the above-mentioned three requirements are achieved. The last of these requirements, i.e. that the end of the outer conductor be located substantially at a valley of the corrugation, is fulfilled for the following reason: As previously described when the guide part 10 is correctly positioned on the end of the cable as shown in FIG. 2c, the radial tongues 16 fits into that valley of the corrugation of the outer conductor 9 which is located closest to the end of the jacket. A well-established longitudinal relationship is thereby established between the position of that valley and the abutment surface 13 of the guide part 10. When hereafter during operation of the second cutting means 18 the end of this means 18 is brought into contact with the abutment surface 13, the second cutting edge 23 will be located at the appropriate longitudinal position S relative to the abutment surface 13 and hence to said first valley of the corrugation. Provided the longitudinal dimensions of the cutter means 26 are properly chosen, corresponding to the actual longitudinal distance between the valleys of the corrugation, the outer conductor will be cut off substantially at the valley adjacent said first valley, whereby the third requirement mentioned above will be fulfilled.

For the sake of clarity the second cutting means 18 according to this embodiment of the invention is shown in FIG. 3b seen from the end indicated by A in FIG. 3a, i.e. from that end into which the cable during operation of the tool is inserted. The relative radial positions of the cutting edges 22 and 23 can be seen from this Figure.

LIST OF PARTS

1 Jacket cutting means
2 Tubular body of jacket cutting means
3 Open end of jacket cutting means
4 End wall of jacket cutting means
5 Cutting means of jacket cutting means
6 Cutting edge
7 Jacket
8 End of cable
9 Outer conductor
10 Guide part
11 Resilient tubular section
12 First region
13 Abutment surface
14 Second region
15 Slit
16 Tongue
17 Valley of the corrugation
18 Second cutting means
19 Guide shaft
20 Tubular house of second cutting means
21 First longitudinal section of second cutting means
22 First cutting edge
23 Second cutting edge
24 Guide track
25 Guide track
26 Cutter means
27 Drive shaft
28 Opening in second cutting means
29 End face of second cutting means
30 Hollow interior of inner conductor
31 Inner conductor
32 Insulation (dielectric) material between inner- and outer conductor
33 Crest of corrugation

What is claimed is:

1. A stripping tool for a coaxial cable, the cable comprising a jacket, a non-helically corrugated outer conductor comprising a repeated pattern of crests and valleys and a dielectric material between said outer conductor and an inner conductor, said tool comprising cutting means for cutting off the jacket, the outer conductor, the dielectric material between the outer conductor and inner conductor, and the inner conductor at relative cut-off positions in the longitudinal direction of the cable, wherein a guide part is provided for determining a position relative to said pattern of the corrugation of the outer conductor, such that said relative cut-off-positions are defined relative to the pattern, and wherein at least a portion of the guide part is radially resilient and has an inner diameter adapted to receive the cable.

2. The stripping tool according to claim 1, wherein said guide part comprises at least one position-determining member a part of which member being adapted to fit into a valley of the corrugated outer conductor whereby a longitudinal position relative to the valley is established.

3. The stripping tool according to claim 1, wherein said guide part comprises at least one position determining member a part of which member being adapted to rest on top of a crest of the corrugated outer conductor whereby a longitudinal position relative to the crest is established.

4. The stripping tool according to claim 1, wherein said guide part comprises a radially resilient tubular body, the outer circumferential surface of which is subdivided into a first region with a first diameter, a second region, the diameter of which can be either equal to the diameter of said first region or different herefrom, and a third region forming a radially outwardly extending abutment surface.

5. The stripping tool according to claim 4, wherein said first, second, and third regions are provided with a plurality of longitudinally extending slits through the wall of said guide part in order to provide said radial resiliency, and that said guide part at the longitudinal end hereof adjoining said second region is provided with a resilient tubular section.

6. The stripping tool according to claim 4, wherein said cutting means includes a conductor and dielectric cutting member for cutting the outer conductor, the inner conductor, and the dielectric material off at predetermined longitudinal positions relative to said pattern of the corrugated outer conductor, the conductor and dielectric cutting member having at least one cutting edge where said conductor and dielectric cutting member is formed as a tubular body comprising a first longitudinal section of the inner circumferential wall of said body, the diameter of the first section corresponding to the outer diameter of said first region of the guide part, and where said first longitudinal section is provided with an end face such that this end face, during use of the stripping tool, is brought into contact with said abutment surface of the guide part, whereby said predetermined longitudinal positions relative to the pattern of the corrugated outer conductor are determined, and where said conductor and dielectric cutting member in its interior and coaxially therewith is provided with a cutter comprising two cutting edges, the longitudinal distance between the two cutting edges corresponding to the longitudinal distance between the end of the outer conductor and the end of the inner conductor and the dielectric material, and where said conductor and dielectric cutting member is further provided with a coaxially extending guide shaft to be inserted into the cable during use of the stripping tool.

7. The stripping tool according to claim 1, wherein the inner diameter of said guide part corresponds to the outer diameter of the coaxial cable.

8. The stripping tool according to claim 1, wherein said cutting means includes a jacket cutting member for moving the jacket of the cable over a predetermined longitudinal distance from one end of the cable, where said jacket cutting member comprises a tubular body, the inner diameter of which corresponds to the outer diameter of the cable, where said tubular body is open at one of its longitudinal ends and completely or partially closed by an end wall at the opposite longitudinal end, and which tubular body on the inner circumferential surface is provided with a cutting blade for stripping the jacket of the cable.

9. A method for stripping a coaxial cable comprising a non-helically corrugated outer conductor and a hollow inner conductor using the stripping tool according to claim 1, wherein said cutting means further includes a jacket cutting member having a cutting edge, and a conductor and dielectric cutting member for cutting the outer conductor, the inner conductor, and the dielectric material off at predetermined longitudinal positions relative to said pattern of the corrugated outer conductor, the conductor and dielectric cutting member having at least one cutting edge, wherein said guide part has at least one position-determining tongue and wherein said method comprises the following steps:

(a) stripping a predetermined length of said jacket by inserting the end of the cable into an open end of said jacket cutting member to point where the end of the cable is brought into contact with the cutting edge of the jacket cutting member, whereafter the jacket cutting member is rotated relative to the cable, the cable being still advanced longitudinally within the jacket cutting member, until the end of the cable reaches an end wall of the jacket cutting member;

(b) removing of the jacket cutting member from the end of the cable;

(c) inserting the end of the cable into a portion of the guide part furthest away from the at least one position-determining tongues to a longitudinal position, where said at least one tongues fits into a valley of the corrugation on the outer conductor which is closest to the end of the jacket, thereby obtaining a longitudinal position of an abutment surface on the guide part relative to the valley;

(d) inserting the conductor and dielectric cutting member over the guide part, cutting until a point is reached where the inner conductor and the insulating material is brought into contact with the at least one cutting edge of the conductor and dielectric cutting member, rotating said conductor and dielectric cutting member relative to the guide part and advancing said conductor and dielectric cutting member longitudinally relative to the guide part until an end face of the conductor and dielectric cutting member is brought into contact with the abutment surface provided on the guide part; and (e) removing the conductor and dielectric cutting member and the guide part from the cable.

10. The method according to claim 9, wherein step (c) is replaced by the following step:

(f) inserting the end of the cable into that an open end of the guide part furthest away from the at least one position-determining tongues to a longitudinal position where said tongues fit a crest of the corrugation on the outer conductor which is closest to an end of the outer conductor, thereby obtaining a longitudinal position of the abutment surface relative to the crest.

11. A stripping tool for a coaxial cable, the cable comprising jacket, a non-helically corrugated outer conductor comprising a repeated pattern of crests and valleys and a dielectric material between said outer conductor and an inner conductor, said tool comprising cutting means for cutting off the jacket, the outer conductor, the dielectric material between the outer conductor and inner conductor, and the inner conductor at relative cut-off positions in the longitudinal direction of the cable, wherein a guide part is provide for determining a position relative to said pattern of the corrugation of the outer conductor, such that said relative cut-off-positions are defined relative to this pattern, wherein said guide part comprises a radially resilient tubular body, the outer circumferential surface of which is subdivided into a first region with a first diameter, a second region, the diameter of which can be either equal to the diameter of said first region or different herefrom, and a third region forming a radially outwardly extending abutment surface;

wherein said cutting means includes a conductor and dielectric cutting member for cutting the outer conductor, the inner conductor, and the dielectric material off at predetermined longitudinal positions relative to said pattern of the corrugated outer conductor, where said conductor and dielectric cutting member is formed as a tubular body comprising a first longitudinal section of the inner circumferential wall of said body, the diameter of the first section corresponding to the outer diameter of said first region of the guide part, and where said first longitudinal section is provided with an end face such that this end face, during use of the stripping tool, is brought into contact with said abutment surface of the guide part, whereby said predetermined longitudinal positions relative to the pattern of the corrugated outer conductor are determined, and where said conductor and dielectric cutting member in its interior and coaxially therewith is provided with a cutter comprising two cutting edges, the longitudinal distance between the two cutting edges corresponding to the longitudinal distance between the end of the outer conductor and the end of the inner conductor and the dielectric material, and where said conductor and dielectric cutting member is further provided with a coaxially extending guide shaft to be inserted into the cable during use of the stripping tool.

12. A method for stripping a coaxial cable using a stripping tool, the cable comprising a jacket, a non-helically corrugated outer conductor comprising a repeated pattern of crests and valleys and a dielectric material between said outer conductor and an inner conductor, said tool comprising cutting means for cutting off the jacket, the outer conductor, the dielectric material between the outer conductor and inner conductor, and the inner conductor at relative cut-off positions in the longitudinal direction of the cable, wherein a guide part is provided for determining a position relative to said pattern of the corrugation of the outer conductor, such that said relative cut-off-positions are defined relative to the pattern, wherein said cutting means further includes a jacket cutting member having a cutting edge, and a conductor and dielectric cutting member for cutting the outer conductor, the inner conductor, and the dielectric material off at predetermined longitudinal positions relative to said pattern of the corrugated outer conductor, the conductor and dielectric cutting member having at least one cutting edge, wherein said guide part has at least one position-determining tongue and, wherein said method comprises the following steps:

(a) stripping a predetermined length of said jacket by inserting the end of the cable into an open end of said jacket cutting member to a point where the end of the cable is brought into contact with the cutting edge of the jacket cutting member, whereafter the jacket cutting member is rotated relative to the cable, the cable being still advanced longitudinally within the jacket cutting member, until the end of the cable reaches an end wall of the jacket cutting member;

(b) removing of the jacket cutting member from the end of the cable;

(c) inserting the end of the cable into a portion of the guide part farthest away from the at least one position-determining tongue to a longitudinal position, where said at least one tongue fits into a valley of the corrugation on the outer conductor which is closest to the end of the jacket, thereby obtaining a longitudinal position of an abutment surface on the guide part relative to the valley;

(d) inserting the conductor and dielectric cutting member over the guide part, cutting until a point is reached where the inner conductor and the insulating material is brought into contact with the at least one cutting edge of the conductor and dielectric cutting member, rotating said conductor and dielectric cutting member relative to the guide part and advancing said conductor and dielectric cutting member longitudinally relative to the guide part until an end face of the conductor and dielectric cutting member is brought into contact with the abutment surface provided on the guide part; and (e) removing the conductor and dielectric cutting member and the guide part from the cable.

13. The method according to claim 12, wherein step (c) is replaced by the following step:

(f) inserting the end of the cable into an open end of the guide part furthest away from the at least one position-determining tongue to a longitudinal position where said tongues fit a crest of the corrugation on the outer conductor which is closest to an end of the outer conductor, thereby obtaining a longitudinal position of the abutment surface relative to the crest.

* * * * *

UNITED STATES PATENT AND TRADEMARK OFFICE
CERTIFICATE OF CORRECTION

PATENT NO.     : 6,668,459 B2
DATED          : December 30, 2003
INVENTOR(S)    : Henningsen, Jimmy et al.

It is certified that error appears in the above-identified patent and that said Letters Patent is hereby corrected as shown below:

<u>Column 7,</u>
Line 35, "cutting means includes a jacket cutting member for moving" should be
-- cutting means includes a jacket cutting member for removing --
Line 59, "jacket cutting member to point where the end of the" should be
-- jacket cutting member to a point where the end of the --

<u>Column 8,</u>
Line 4, "said at least one tongues fits into a valley of the" should be
-- said at least one tongue fits into a valley of the --
Line 24, "(f) inserting the end of the cable into that an open end of" should be
-- (f) inserting the end of the cable into an open end of --
Line 32, "prising jacket, a non-helically corrugated outer conductor" should be
-- prising a jacket, a non-helically corrugated outer conductor --

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,668,459 B2
DATED         : December 30, 2003
INVENTOR(S)   : Henningsen Jimmy et al.

It is certified that error appears in the above-identified patent and that said Letters Patent is hereby corrected as shown below:

<u>Column 10,</u>
Line 32, "said tongues fit a crest of the corrugation on the outer" should be
-- said tongue fits a crest of the corrugation on the outer --

Signed and Sealed this

Twentieth Day of July, 2004

JON W. DUDAS
*Acting Director of the United States Patent and Trademark Office*